United States Patent [19]

Kirilishin

[11] 4,234,347
[45] Nov. 18, 1980

[54] BINDER FOR CHEMICALLY RESISTANT CONCRETE AND PROCESS FOR PRODUCING THIS BINDER

[76] Inventor: Vsevolod P. Kirilishin, ulitsa Zhanny Leburb, 6, kv. 4, Odessa, U.S.S.R.

[21] Appl. No.: 71,056

[22] Filed: Aug. 30, 1979

[51] Int. Cl.$^3$ ............................................. C09K 3/00
[52] U.S. Cl. ............................. 106/286.7; 106/84; 106/287.34; 106/314
[58] Field of Search .............. 106/286.7, 287.34, 314, 106/84, 74

[56] References Cited

U.S. PATENT DOCUMENTS

| | | | |
|---|---|---|---|
| 3,498,802 | 3/1970 | Bickford et al. | 106/52 |
| 3,754,952 | 8/1973 | Kirilishin et al. | 106/84 |

*Primary Examiner*—Lorenzo B. Hayes
*Attorney, Agent, or Firm*—Burgess, Ryan and Wayne

[57] ABSTRACT

A binder for a chemically resistant concrete, comprising from 30 to 80% by weight of a finely divided quartz sand having a specific surface area of from 1000 to 5000 cm$^2$/g, and from 20 to 70% by weight of at least one of crystalline modifications of silica. The crystalline modification of silica used in the binder is a tridymite and/or cristobalite containing on the surface of their particles from 0.5 to 6 mol percent one of R$_2$O, oxides, wherein R is sodium, potassium.

A process to produce a binder for a chemically resistant concrete, which comprises mixing quartz sand with at least one of such compounds as sodium carbonate, potassium carbonate, sodium hydroxide, potassium hydroxide, said compounds being taken in an amount from 0.7 to 15% by weight. The resultant mixture is heated to 1000°–1550° C. to produce an oxide R$_2$O, wherein R is sodium, potassium, and cause said oxide to get bound with the surface of the quartz sand particles. The mixture is treated at this temperature until formation of at least one of such crystalline modifications of silica as cristobalite, tridymite, and then is cooled, crushed and mixed with quartz a finely divided sand having a specific surface area of 1000–5000 cm$^2$/g.

17 Claims, No Drawings

BINDER FOR CHEMICALLY RESISTANT CONCRETE AND PROCESS FOR PRODUCING THIS BINDER

BACKGROUND OF THE INVENTION

1. Field of the Invention

The present invention relates to binder compositions and processes for producing them, and particularly to a binder for chemically resistant concrete and a process to produce this binder. Most advantageously the invention can be used for manufacturing finishing blocks and panels, bearing structural members intended for use in a chemically agressive enviroment.

Though the chemical industry in most countries began to develop intensively relatively long ago, the problem of making not expensive chemically resistant concrete has not been adequately solved until the present time. It is a common knowledge that the concrete physical and chemical properties and its cost depend on the properties and characteristics of the binder and the process for producing it. Therefore, most attempts in solving this problem have been aimed at improving binder compositions and processes for producing them.

2. Description of the Prior Art

There is known a process for making concrete, using as a binder a silicic acid hydrosol (FRG Patent No. 1,240,457) and wherein to a solid silicate of the alkaline element with a silica modulus (a molar ratio of $SiO_2$ to an alkali metal oxide) from 1 to 4.2 is added either a mixture of silicic acid hydrosol with a water-insoluble inorganic silicate in an amount from 0.3 to 3% by weight, or one of insoluble colloid metal oxides such as $Al_2O_3$, $TiO_2$, $ZnO_2$, $SnO_2$, $CrO_3$, $F_2O_3$ having particle size less than 200.

Japan Patent Specification No. 38-10178 describes a method for making an acid-resisting cement which is a dried and powdered alkaline hydrosilicate with a silica modulus not higher than 5, whereto are added additional agents for neutralizing alkali in the alkaline hydrosilicate to produce hydrated silica serving as a binding agent, and thereby improving water resistance of the cement.

However, in all the above cases as the binding agent is used a hydrated silica which is the most chemically unstable modification of $SiO_2$, and therefore the resultant binders being sufficiently stable in concentrated acids, exhibit low stability in water, aqueous solutions of salts and weak solutions of acids, especially hot ones, and in alkalt solutions and vapours. In addition, since the above binders harden mainly due to dehydration of hydrosilica when the latter is dried, pores and capillaries, which form as a result of drying, bring down the binder strength, water resistance and impermeability in solutions, vapours and gases.

U.S. Pat. No. 3,498,802 describes a steam treatment process for producing thermoplastic materials and hydraulic cements, which comprises mixing materials, oxides and other ingredients which when melted together produce alkali silicate glass containing about 80–94 mol percent $SiO_2$ and 6–20 mol percent $R_2O$, wherein $R_2O$ consists of $Na_2O$, $K_2O$, and mixtures thereof, distributed throughout the volume of glass, ballmilling said mixture and melting it at a temperature of about 1500°, cooling the resultant melt to a glass, grinding the glass thus obtained to a particle size less than 0.149 mm (preferably less than 0.074 mm), and partially crystallizing anhydrous powdered glass by heating at about 900°–1000° C. to produce cristobalite, quartz and tridymite.

The resultant anhydrous semicrystalline powder containing some quantity of alkali silicate glass is used as an initial material for making thermoplastic materials and hydraulic cements. This powder, when treated in gaseous environment of at least 50% by weight steam at a pressure of at least one atmosphere and a temperature between about 100°–200° C. for a period of time sufficient to develop at least a surface portion on the particles of said powder, contains within its volume up to about 30% by weight of water.

The semicrystalline glass powder exhibits cementing properties due to adhesion between particles through silanol groups Si—OH when being dried. The presence of cristobalite, quartz or tridymite in the glass particles makes the resultant binder more durable, and decreasig oxides of the alkali metals in the volume of semicrystalline glass to 20-6 mol percent, i.e. increasing silica modulus from 4 to 15.7 permits the chemical stability of said binder to be improved in comparison with the afore-said cementing agents. The above (binder, however contains as a cementing agent a hydrated silica exhibiting insufficient chemical stability, and the presence in the hydrated semicrystalline glass volume of a rather considerable amount of alkali oxides and a large spesific surface area of the powdered particles affect the chemical resistance and mechanical strength of the hardened composition.

This is explained by that the hydrated amorphous cementing agent under the action of water, aqueous solutions and vapours is partially dissolved and washed out, and completely dissolved in alkali solutions.

The necessity of grinding the initial material and repeated heating of the alkali silic glass to a high temperature makes longer the production process and results in an elevated energy consumption.

There is also known a binder for making a chemically resistant concrete, featuring better physical and chemical properties (cf. U.S. Pat. No. 3,754,952). This binder consists of 40–80 weight percent finely divided quartz sand having a specific surface area of 1000–5000 $cm^2/g$, and 20–60 weight percent finely divided alkali silica ingredient, said quartz sand containing a silica component bound with at least one of oxides $R_2O$, wherein R is sodium, potassium. High silica glass containing within its volume from 8 to 13 mol percent sodium oxide or potassium oxide, is used as a silica component.

The process to produce this binder comprises the following steps: mixing quartz sand with at least one of such compounds as sodium carbonate, potassium carbonate, sodium hydroxide, potassium hydroxide; heating the resultant mixture for producing and melting an oxide $R_2O$, wherein R is sodium, potassium; treating and cooling the resultant melt to produce alkali silica ingredient; grinding the resultant alkali silica ingredient; grinding quartz sand to obtain a specific surface area thereof from 1000 to 5000 $cm^2/g$; mixing a finely divided alkali silica ingredient with a finely divided quartz sand. According to this process at least one of said compounds (sodium carbonate, potassium carbonate, sodium hydroxide, potassium hydroxide or mixtures thereof) is added to quartz sand in amounts of 10 to 30 weight percent.

To obtain a high-silica alkaline glass, a mixture of the quartz sand with one of said compounds is heated to a temperature of 1580°–1800° C. The mixture is treated at this temperature to completely melt down the quartz sand and produce a homogenous high-silica alkaline glass melt. When being cooled the resultant melt hardens and cracks to form granules with a size from 0.5 to 20 cm, which are then crushed. The binder thus produced represents a homogenous composition consisting of amorphous silica and potassium oxide and/or sodium oxide.

When the above binder is used for manufacturing concrete articles it is mixed with water and then treated in autoclaves in a saturated steam environment at a temperature not less than 190° C. In this case the binder hardens due of vitreous silica dissolving and crystallizing on the finely divided particles of the quartz sand.

Thus, unlike the known binder compositions the above binder contains as a main cementing agent as anhydrous crystalline silica which is the most thermodynamically and chemically stable with a normal state of $SiO_2$. This accounts for excellent physico-chemical properties of a quartz based binder and its chemical resistance not only in acid solutions by any concentration but also in alkali solutions with pH being up to 12, as well in salt solutions and organic dissolvents.

However, when the concrete made with the use of this binder is exposed for a long period of time to water environment, its strength lowers in the first two months by 40–50%. This is explained by the fact that the alkaline hydro-silicates contained in the binder dissolve in water and are washed out from the concrete, which results in a higher porosity lowering the strength thereof. Therefore, a higher water resistance of the concrete made with the use of the above binder can be achieved only be decreasing the content of sodium and potassium oxides in the binder. It has ben found however that even at maximum temperatures (up to 1600° C.) which can be obtained in glass furnaces the content of said oxides cannot be lowered below 8 mol percent. At the same time using higher temperature obtainable in electric furnaces entails considerable consumption of electric energy, affects the durability of concrete and is not advantageous from a commercial point of view. In addition, grinding relatively durable glass granules after their being cooled requires a considerable amount of energy.

SUMMARY OF THE INVENTION

The principal object of the invention is to provide a binder for chemically resistant concrete, featuring a higher water resistance and which is less expensive in production in comparison with the known compositions of this type.

Another object of the invention is to provide an economical process for producing a binder for a chemically resistant concrete.

Still another object of the invention is to improve a water resistance of a binder.

Yet another obuect of the invention is to bring down energy consumption in producing a binder.

A further object of the invention is to improve the mechanical strength of concrete made with the use of a silica based binder.

Still further object of the invention is to provide a more efficient process for producing a binder.

Yet further object of the invention is to bring down cost of grinding a silica ingredient containing potassium oxide or sodium oxide.

These and other objects of the invention are accomplished in that a binder for chemically resistant concrete, comprising a finely divided qurtz sand having a specific surface area of 1000–5000 $cm^2/g$ and a finely divided alkaline silica ingredient consisting of a silicic component bound with at least one of oxides $R_2O$, wherein R is sodium, potassium, according to the invention contains as a silicic component at least one crystalline modification of silica such as tridymite, cristobalite, the amount of sodium oxide, potassium oxide or a mixture thereof being from 0.5 to 6 mol percent, said ingredients taken in the following amounts (by weight percent):

finely divided quartz sand: from 30 to 80
crystalline modification of silica containing potassium oxide, sodium oxide or a mixture thereof: from 20 to 70

The presence in the binder composition of cristobalite, tridymite or a mixture thereof containing on the surface of particles from 0.5 to 6 mol percent alkali metal oxides permits the content of alkali hydrosilicates to be minimized, and thereby to essentially improve the water resistance of a chemically resistant concrete in comparison with concrete made with the use of the known silica based binder compositions.

Decreasing the alkali metal oxides content below 0.5 mol percent is not advisable since of the solving of the silicic component and its crystallizing on the quartz sand particles during the treatment in an autoclave and hence hardening of the binder in the concrete may cease if the amount of alkali in the binder composition is not sufficient.

At the same time the proposed binder is less expensive as the cristobalite and tridymite are formed from the quartz sand at a lower temperatures than high-silica alkaline glass in the known binder compositions of the same type.

The crystalline modification of silica preferably contains not less than 70% by weight of particles having a size of 0.315–1.25 mm, with the balance being powder-like fraction.

Such proportion of fractions in the crystalline modification of silica provides for a sufficiently high strength of concrete and a full utilization of the powdered particles formed as a result of crushing cristobalite and tridymite granules.

In the case of using tridymite it is expedient that the latter contain 6 mol percent said oxide.

Such binder exhibits a higher hardening speed when treated in an autoclave.

Energy consumption in producing this binder is minimum in the case of using cristobalite containing 6 mol percent potassium oxide.

Using a cristobalite containing 0.5 mol percent sodium oxide provides for a maximum water resistance of the binder.

It is advisable that in the case of using tridymite as a crystalline modification of silica the binder contain 70% by weight of said crystalline modification of silica and 30% by weight of a finely divided quartz sand. Such proportion of the ingredients in the binder provides for a maximum density and mechanical strength of concrete. The binder preferably contains a mixture of tridymite and cristobalite, which provides for an optimum relationship between the duration of hardening of the binder and the amount of energy consumed for heating.

The best results are achieved when the binder contains cristoablite and tridymite in the proportion 1 to 4.

These and other objects of the invention are also accomplished in a process for producing a binder, which comprises mixing quartz sand with at least one of such compound as sodium carbonate, potassium carbonate, sodium hydroxide and potassium hydroxide, heating the resultant mixture to produce an oxide $R_2O$, wherein R sodium, potassium, and cause said oxide to get bound with the surface of the quartz sand particles, treating to produce alkaline silica ingredient, cooling and grinding the resultant mixture, grinding quartz sand so that it has a specific surface area of 1000–5000 cm$^2$/g, and mixing a finely divided alkaline silica ingredient with a finely divided quartz sand, and wherein according to the invention at least one of said compounds (sodium carbonate, potassium carbonate, sodium hydroxide, potassium hydroxide, or mixtures thereof) is mixed with quartz sand in an amount of 0.7–15% by weight, with the resultant mixture being heated to a temperature of 1000°–1550° C. and then treated at this temperature to produce at least one of such crystalline modifications of silica as cristobalite and tridymite.

Such process provides for caking of oxides with quartz sand to produce silicates on the surface of particles, and conversion of quartz into tridymite and cristobalite without melting, which results in a lower unit energy consumption than for obtaining a high-silica alkaline glass in the process for producing the known silica based binder. At the same time the alkali silica ingredient (in this case a crystalline modification of silica containing oxides) is produced with a smaller amount of oxide-forming compounds such as sodium carbonate and potassium carbonate as well as sodium hydroxide and potassium hydroxide, which improves water resistance properties of the binder. Grinding the caked lumps of crystalline modification of silica requires less energy than grinding high-silica alkaline glass in the process for producing the known silica based binder, which is explained by the fact that only 50–60% of the caked mass has to be ground. In addition, the strength of the mechanical bond between the particles of the caked mass is relatively low.

It is recommended to cool the crystalline modification of silica containing said oxide with a temperature lowering rate of 800 deg. C. per hour, which provides for a minimum quantity of lumps.

To produce binder having a maximum water resistance it is necessary that the amount of the sodium hydroxide introduced into quartz sand constitute 0.7% by weight.

In order to obtain a maximum efficiency of the process with a lower consumption of energy it is necessary that the amount of potassium carbonate introduced into quartz sand constitute 15% by weight. The mixture of quartz sand with one of such compounds as sodium carbonate, potassium carbonate, sodium hydroxide, potassium hydroxide or mixtures thereof is treated at a temperature of 1200° C. preferably for 30 minutes until conversion of quartz into cristobalite. This permits consumption of energy for heating to be minimized.

It is expedient that the mixture of quartz sand with one of such compounds as sodium carbonate, potassium carbonate, sodium hydroxide, potassium hydroxide or mixtures thereof be treated at a temperature of 1200°–1400° C. for 30–60 minutes until conversion of quartz into tridymite, which makes it possible to produce a binder featuring the highest speed of hardening. It is advisable that the mixture of quartz sand with one of such compounds as sodium carbonate, potassium carbonate, sodium hydroxide, potassium hydroxide or mixtures thereof be treated at a temperature of 1550° C. for 10 minutes, which will provide the highest efficiency of the process. In the case of using such compounds as sodium carbonate, potassium carbonate, sodium hydroxide and potassium hydroxide, they are dissolved in water before being mixed with quartz sand, in which ase the consumption of additional material is minimum and convertion of quartz takes place under the most favorable conditions.

It is further expedient that the mixture of quartz sand with dry sodium carbonate and dry potassium carbonate be moistened before being heated, which will prevent carrying away of an additional free-flowing material by the heat carrier when the binder is produced in a rotary furnace or in a furnaces with a boiling bed.

EXAMPLE 1

A binder for a chemically resistant concrete according to the invention is produced in the following manner.

A quartz sand in an amount of 0.5 tons and a sodium hydroxide in an amount of 3.7 kg dissolved in water are mixed together in a blade-paddle mixer. The homogeneous mixture thus obtained is placed into a rotary furnace and heated to 1550° C. Being heated the sodium hydroxide decomposes to form sodium oxide and water. As a result of reaction between the sodium oxide and silica there are formed silicates on the surface of quartz sand particles. The mixture is treated at a temperature of 1550° C. for ten minutes until structural conversion of quartz into cristobalite. The resultant alkaline silica ingredient (cristobalite containing 0.5 mol percent sodium oxide) is then cooled, with the temperature lowering rate being 1000 deg.C. per hour, which is effected by blowing said ingredient with air. Having been cooled the cristobalite containing sodium oxide is screened with the aid of a vibrating screen for separating particles having size of 0.315–0.63 mm. The second ingredient (quartz sand) in an amount of 0.214 tons is ground in a ball mill so that it has a specific surface area of 5000 cm$^2$/g. A finely divided quartz sand is mixed with a finely divided and screened crystobalite (0.315–0.63 mm) containing the sodium oxide. The binder composition thus obtained consists of the following ingredients (by weight percent):

quartz sand: 30
crystalline modification of silica (cristobalite) containing 0.5 mol percent sodium oxide: 70

From the binder thus obtained there were shaped equal in size prismoid specimens measuring 4×4×16 cm. To this end the binder was mixed with water so as to form a plastic mass which was then placed in moulds, compacted by vibration and autoclaved in a saturated steam environment at a pressure of 12 atm. and a temperature of 190° C. for 72 hours. The specimens thus obtained were cooled to room temperature and then removed from the moulds.

In a similar manner there were also produced specimens from the known in the art water-resisting binder based on high-silica alkaline glass, containing the following ingredients (by weigh percent):

finely divided quartz sand: 60
finely divided alkaline high-silica glass containing 8 mol percent sodium oxide: 40.

For the purpose of comparison the specimens made from the proposed and the prior art binders were subjected to bending and compression test for determining their ultimate bending and compression strengths as well as their water resistance coefficients both for their normal and water-saturated states.

During the test the load applied to the specimens was gradually increased until they collapsed. Saturating the specimens with water was effected by boiling them in water for one hour and then keeping them in water for another 48 hours. The water resistance coefficient for bending was determined as a ratio of the ultimate bending strength for the saturated state to the ultimate bending strength for the normal state. The water resistance coefficient for compression was determined in the same manner.

The comparison test results are given in Table below.

|   | Characteristics of Binder | Binder | |
|---|---|---|---|
|   |   | prior art | According to the present invention |
| 1 | Ultimate bending strength | | |
|   | - for the normal state, kg/cm$^2$ | 144 | 128 |
|   | - for the water-saturated state, kg/cm$^2$ | 75 | 110 |
| 2 | Ultimate compression strength | | |
|   | - for the normal state, kg/cm$^2$ | 438 | 488 |
|   | - for the water-saturated state, kg/cm$^2$ | 211 | 390 |
| 3 | Water-resistance coefficient | | |
|   | - for bending | 0.52 | 0.86 |
|   | - for compression | 0.48 | 0.80 |

Unit energy consumption for production of the proposed binder is 10% lower than for production of the prior art binder.

From the concrete made with the use of the prior art binder and the binder prepared as disclosed in this example there were moulded test cubes measuring 10×10×10 cm. Quartz sand and crushed quarzite were used as inert fillers. The specimens were subjected to compression test to determine the ultimate compression strength bond for the normal and water-saturated states, the water resistance coefficient and the acid resistance. The ultimate compression strength and the water resistance coefficient were determined as described above. For determining the acid resistance the concrete was crushed and boiled in a 30% sulfuric acid water solution for one hour. The acid resistance was determined as a ratio of the weight of the concrete dried after boiling to its initial weight before boiling (in percent).

The test results are given in Table below.

|   | Characteristics of Concrete | Concrete made with the use of | |
|---|---|---|---|
|   |   | prior art binder | binder according to the invention |
| 1 | Ultimate compression strength | | |
|   | - for the normal state, kg/cm$^2$ | 980 | 1111.0 |
|   | - for the water-saturated state kg/cm$^2$ | 509 | 990.0 |
| 2 | Water resistance coefficient | 0.52 | 0.89 |
| 3 | Acid resistance, % | 97.2 | 98.1 |

EXAMPLE 2

A binder for a chemically resistant concrete according to the invention is produced in the following manner.

Sodium carbonate in an amount of 65 kg and a quartz sand in an amount of 0.5 tons are mixed together in a blade-paddle mixer. The homogeneous mixture thus obtained is moistened with water, placed into a rotary furnace and heated to 1200° C. Being heated the sodium carbonate decomposes into sodium oxide and carbon dioxide. As a result of reaction between sodium oxide and silica there are formed silicates on the surface of the quartz sand particles. The mixture is treated at 1200° C. for 30 minutes until conversion of quartz into cristobalite. The resultant alkaline silica ingredient (cristobalite containing 6 mol percent sodium oxide) is then cooled, with the temperature lowering rate being 780 deg.C. per hour, which is effected by placing said ingredient into a running water. Having been cooled and dried the lumps of cristobalite containing the sodium oxide are crushed in a hammer crusher to maximum particle size of 1.25 mm. The second ingredient (quartz sand) in an amount of 0.825 tons is ground in a ball mill so that resultant particles have a specific surface area of 4000 cm$^2$/gm.

Finely divided quartz sand is mixed with a finely divided cristobalite bound with sodium oxide and containing 70% by weight of particles having a size of 0.315-1.25 mm and 30% by weight of dust-like fraction. The binder thus obtained consists of the following ingredients (by weight percent):

quartz sand: 60 crystalline modification of silica (cristobalite) containing 6 mol percent sodium oxide 40.

From the binder thus obtained there were moulded equal in size prismoid specimens measuring 4×4×16 cm, as described in Example 1.

In a similar manner there were also formed specimens from the known in the art water-resisting binder based on a high-silica alkaline glass, containing the following ingredients (by weight percent):

finely divided quartz sand: 60 finely divided high-silica alkaline glass containing 8 mol percent sodium oxide: 40.

For the purpose of comparison the proposed and the prior art binders were subjected to bending and compression tests for determining their ultimate bending and compression strengths for their normal and water saturated states as well as their water resistance coefficients. The test program was similar to that described in Example 1.

The comparison test results are given in Table below.

|   | Characteristics of Binder | Binder | |
|---|---|---|---|
|   |   | prior art | According to the present invention |
| 1 | Ultimate bending strength | | |
|   | - for the normal state, kg/cm$^2$ | 144 | 165 |
|   | - for the water-saturated state, kg/cm$^2$ | 75 | 92 |
| 2 | Ultimate compression strength | | |
|   | - for the normal state, kg/cm$^2$ | 438 | 662 |
|   | - for the water-saturated state, kg/cm$^2$ | 211 | 350 |
| 3 | Water resistance coefficient | | |
|   | - for bending | 0.52 | 0.56 |
|   | - for compression | 0.48 | 0.53 |

Unit energy consumption for production of the proposed binder is 50% lower than for production of the prior art binder.

From the concrete made with the use of the prior art binder and the binder produced as disclosed in this example there were moulded test cubes measuring 10×10×10 cm. Crushed quarzite was used as an inert filler. The specimens were subjected to compression test to determine the ultimate compression strength both for the normal and water-saturated states, the water resistance coefficient and the acid resistance. These characteristics were determined in the same manner in Example 1.

The test results are given in Table below:

| | Characteristics of Concrete | Concrete made with the use of | |
|---|---|---|---|
| | | prior art binder | binder according to the invention |
| 1 | Ultimate compression strength | | |
| | - for the normal state, kg/cm$^2$ | 652 | 703 |
| | - for the water-saturated state, kg/cm$^2$ | 313 | 492 |
| 2 | Water resistance coefficient | 0.48 | 0.70 |
| 3 | Acid resistance, % | 97.6 | 98.8 |

EXAMPLE 3

A binder for a chemically resistant concrete, according to the invention is produced as follows.

Potassium carbonate taken in an amount of 85 kg in the form of 50% water solution (by dry weight) is mixed with quartz sand taken in an anmount of 0.5 tons in a blade-paddle mixer. The resultant mixture is placed into a rotary furnace and heated to 1200° C. Being heated the water evaporates and the potassium carbonate decomposes into potassium oxide and carbon dioxide. As a result of reaction between potassium oxide and silica on the surface of the quartz sand particles there are formed silicates. The mixture is treated at 1200° C. for one hour until conversion of quartz into tridymite. The resultant alkaline silica ingredient (tridymite, containing 6 mol percent potassium oxide) is cooled, with the temperature lowering rate being 7800° C. per hour, which is effected by unloading said ingredient from the furnace into a running water. Having been cooled and dried tridymite containing potassium oxide is screened with the aid of a vibrating screen to separate particles having size of 0.315–0.63 mm. The second ingredient /quartz sand/ in amount of 2.2 tons is ground in a ball mill so that resultant particles have a specific surface area of 5000 cm$^2$/gm. Finely-divided quartz sand is mixed with the screened tridymite having particle size of 0.315–0.63 mm and containing a potassium oxide.

The binder thus obtained contains the following ingredients (by weight percent):
quartz sand: 80
crystalline modification of silica (tridymite) containing 6 mol percent potassium oxide: 20

From the binder thus obtained there were moulded equal in size prismoid specimens measuring 4×4×16 cm, as described in Example 1, the specimens being autoclaved at 190° C. for 20 hours.

In a similar manner there were also produced specimens from the known in the art water-resisting binder based on a high-silica alkaline glass, containing the following amounts of ingredients (by weight percent):
finely divided quartz sand: 60
finely divided high-silica alkaline glass containing 8 mol percent sodium oxide: 40.

For the purpose of comparison the proposed and the prior art binders were subjected to bending and compression tests for determining their ultimate bending and compression strengths for their normal and water-saturated states as well as their water resistance coefficients.

The test program was similar to that described in Example 1.

The comparison test results are given in Table below.

| | Characteristics of Binder | Binder | |
|---|---|---|---|
| | | prior art | According to the present invention |
| 1 | Ultimate bending strength | | |
| | - for normal state, kg/cm$^2$ | 144 | 117 |
| | - for the water-saturated state, kg/cm$^2$ | 75 | 91 |
| 2 | Ultimate compression strength | | |
| | - for the normal state, kg/cm$^2$ | 438 | 598 |
| | - for the water-saturated state, kg/cm$^2$ | 211 | 448 |
| 3 | Water resistance coefficient | | |
| | - for bending | 0.52 | 0.78 |
| | - for compression | 0.48 | 0.75 |

Unit energy consumption for production of the proposed binder is 25% lower than for production of the prior art binder.

From the concrete made with the use of the prior art binder and the binder prepared as disclosed in this example there were moulded test cubes measuring 10×10×10 cm. Crushed quarzite was used as on inert filler. The specimens were subjected to compression test to determine the ultimate compression strength both for the normal and water-saturated states, the water resistance coefficient and the acid resistance. Said characteristics were determined by the method described in Example 1.

The test results are given in Table below:

| | Characteristics of Concrete | Concrete made with the use of | |
|---|---|---|---|
| | | prior art binder | binder according to the invention |
| 1 | Ultimate compression strength | | |
| | - for the normal state, kg/cm$^2$ | 980 | 1037 |
| | - for the water-saturated state, kg/cm$^2$ | 509 | 861 |
| 2 | Water resistance coefficient | 0.52 | 0.83 |
| 3 | Acid resistance, % | 97.2 | 97.2 |

EXAMPLE 4

A binder for a chemically resistant concrete according to the invention is produced in the following manner.

Potassium carbonate in an amount of 85 kg is mixed with a quartz sand taken in an amount of 0.5 tons in a blade-paddle mixer. The homogeneous mixture thus obtained is placed into a rotary furnace and heated to 1200° C.

Being heated the potassium carbonate decomposes into potassium oxide and carbon dioxide. As a result of reaction between potassium oxide and silica there are formed silicates on the surface of the quartz sand particles. The mixture is treated at 1200° for 20 minutes until conversion of quartz into cristobalite. The resulting alkaline silica ingredient (cristobalite containing 6 mol percent potassium oxide) is then cooled, with the temperature lowering rate being 800 deg.C. per hour, which is effected by blowing the ingredient with air. Having been cooled the cristobalite containing potassium oxide is screened with the aid of a vibrating screen to separate particles having size of 0.315–1.25 mm. The second ingredient /quartz sand/ taken in an amount of 2.2 tons is ground in a ball mill to obtain particles having specific surface area of 1000 cm$^2$/gm. Finely divided quartz sand is mixed with the screened cristobalite containing oxide.

The binder thus obtained contains the following ingredients (by weight percent):
quartz sand: 80
crystalline modification of silica (cristobalite) containing 6 mol percent potassium oxide: 20

From the binder thus obtained them were moulded equal in size prismoid specimens measuring 4×4×16 cm, as described in Example 1, exept for the duration of treatment in an autoclave which in this case is 48 hours.

In a similar manner there were also produced specimens from the known in the art water-resisting binder, based on a high-silica alkaline glass, containing the following amounts of ingredients (% by weight):
finely divided quartz sand: 60
finely divided high-silica alkaline glass containing 8 mol percent sodium oxide: 40

For the purpose of comparison the proposed and the prior art binders were subjected to bending and compression tests for determining their ultimate bending and compression strengths for their normal and water-saturated states as well as their water resistance coefficients. The test program was similar to that described in Example 1.

The comparison test results are given in Table below.

Unit energy consumption for production of the proposed binder is 60% lower than for production of the prior art binder.

|  | Characteristics of Binder | Binder | |
|---|---|---|---|
|  |  | prior art | According to the present invention |
| 1 | Ultimate bending strength | | |
|  | - for the normal state, kg/cm$^2$ | 144 | 116 |
|  | - for the water-saturated state, kg/cm$^2$ | 75 | 75 |
| 2 | Ultimate compression strength | | |
|  | - for the normal state, kg/cm$^2$ | 438 | 420 |
|  | - for the water-saturated state, kg/cm$^2$ | 211 | 260 |
| 3 | Water resistance coefficient | | |
|  | - for bending | 0.52 | 0.65 |
|  | - for compression | 0.48 | 0.62 |

From the concrete made with the use of the prior art binder and the binder prepared as disclosed in this example there were moulded test cubes measuring 10×10×10 cm. Crushed quarzite was used as an inert filler. The specimens were subjected to compression tests to determine their ultimate strengths both for the normal and water-saturated states, the water resistance coefficient and the acid resistance. Said characteristics were determined by the method described in Example 1.

The test results are given in Table below:

|  | Characteristics of Concrete | Concrete made with the use of | |
|---|---|---|---|
|  |  | prior art binder | binder according to the invention |
| 1 | Ultimate compression strength | | |
|  | - for the normal state, kg/cm$^2$ | 497 | 478 |
|  | - for the water-saturated state, kg.cm$^2$ | 214 | 311 |
| 2 | Water resistance coefficient | 0.43 | 0.65 |
| 3 | Acid resistance, % | 97.9 | 98.1 |

EXAMPLE 5

A binder for a chemically resistant concrete according to the invention is produced in the following manner.

Potassium hydroxide in an amount of 5.4 kg dessolved in water is mixed with quartz sand taken in amount of 0.5 tons in a blade-paddle mixer. The homogeneous mixture thus obtained is placed into a rotary furnace and heated to 1400° C.

Being heated the potassium hydroxide decomposes into potassium oxide and water. As a result of reaction between potassium oxide and silica, on the surface of the quartz sand particles there are formed silicates. The mixture is treated at 1400° C. for one hour until conversion of quartz into tridymite. The resultant alkaline silica ingredient (tridymite containing 0.5 mol percent potassium oxide) is then cooled, with the temperature lowering rate being 1000 deg. C. per hour, which is effected by blowing said ingredient with air. Having been cooled the tridymite containing potassium oxide is screened with the aid of a vibrating screen to separate particles having size of 0.315–0.63 mm. The second ingredient (quartz sand) taken in an amount of 2.15 tons is ground in a ball mill so that resultant particles have a specific surface area of 4500 cm$^2$/g. Finely divided quartz sand is mixed with the screened tridymite containing potassium oxide.

The binder composition thus obtained contains the following ingredients (by weight percent)
quartz sand: 70
crystalline modification of silica (tridymite) containing 0.5 mol percent potassium oxide: 30

From the binder thus obtained there were moulded equal in size prismoid specimens measuring 4×4×16 cm, as described in Example 1.

In a similar manner there were also prepared specimens from the known in the art water-resisting binder based on a high-silica alkaline glass, containing the following amounts of ingredients (by weight percent):
finely divided quartz sand: 60
finely divided high-silica alkaline glass containing 8 mol percent sodium oxide: 40

For the purpose of comparison the proposed and the prior art binders were subjected to bending and compression tests for determining their ultimate bending and compression strengths for their normal and water-saturated states as well as their water resistance coefficients. The test program was similar to that described in Example 1.

The comparison test results are given in Table below:

|   | Characteristics of Binder | Binder | |
|---|---|---|---|
|   |   | prior art | According to the present invention |
| 1 | Ultimate bending strength | | |
|   | - for the normal state, kg/cm² | 144 | 161 |
|   | - for the water-saturated state, kg/cm² | 75 | 150 |
| 2 | Ultimate compression strength | | |
|   | - for the normal state, kg/cm² | 438 | 648 |
|   | for the water-saturated state, kg/cm² | 211 | 591 |
| 3 | Water resistance coefficient | | |
|   | - for bending | 0.52 | 0.93 |
|   | - for compression | 0.48 | 0.91 |

Unit energy consumption for production of the proposed binder is 5-10% lower than for production of the prior art binder.

From the concrete made with the use of the prior art binder and the binder prepared as disclosed in this example there were moulded test cubes measuring 10×10×10 cm. Quartz sand and crushed quarzite were used as inert fillers.

The specimens were subjected to compression test to determine the ultimate compression strength both for the normal and water-saturated states, the water resistance coefficient and the acid resistance. Said characteristics were determined by the method described in Example 1.

The test results are given in Table below:

|   | Characteristics of Concrete | Concrete made with the use of | |
|---|---|---|---|
|   |   | prior art binder | binder according to the invention |
| 1 | Ultimate compression strength | | |
|   | - for the normal state, kg/cm² | 980 | 997 |
|   | - for the water-saturated state, kg/cm² | 509 | 897 |
| 2 | Water resistance coefficient | 0.52 | 0.90 |
| 3 | Acid resistance, % | 97.2 | 98.2 |

EXAMPLE 6

A binder for a chemically resistant concrete according to the invention is produced as follows.

Potassium carbonate in an amount of 85 kg is mixed with quartz sand taken in an amount of 0.5 tons in a blade-paddle mixer. The homogeneous mixture thus obtained is moistened with water and then placed into a rotary furnace and heated to 1200° C.

Being heated the potassium carbonate decomposes into the potassium oxide and carbon dioxide. As a result of reaction between the potassium oxide and silica there air formed silicates on the surface of the quartz sand partiles. Treating the mixture at 1200° C. is effected for one hour until conversion of substantially all quartz into tridymite. The resultant alkaline silica ingredient (tridymite containing 6 mol percent potassium oxide) is then cooled, with the temperature lowering rate being 7200° C. per hour, which is effected by unloading said ingredient from the furnace into a running water. Having been cooled and dried the tridymite containing potassium oxide is screened with the aid of a vibrating screen to separate particles having size of 0.63-1.25 mm. The second ingredient (quartz sand) in an amount of 0.235 tons is ground in a ball mill to obtain particles having a specific surface area of 4000 cm²/g. Finely-divided quartz sand is mixed with the screened tridymite (0.63-1.25 mm) containing potassium oxide. The binder thus obtained contains the following ingredients (by weight percent):

quartz sand: 30 crystalline modification of silica (tridymite) containing 6 mol percent potassium oxide: 70

From the binder thus obtained there were moulded equal in size prismoid specimens measuring 4×4×16 cm, as described in Example 1, except for the duration of treatment in an autoclave at 190°, which in this case was 48 hours.

In a similar manner there were also produced specimens from the known in the art water-resisting binder based on a high-silica alkaline glass, containing the following amounts of ingredients (% by weight):

finely divided quartz sand: 60 finely divided high-silica alkaline glass containing 8 mol percent sodium oxide: 40

For the purpose of comparison the proposed and the prior art binders were subjected to bending and compression tests for determining their ultimate bending and compression strengths for their normal and water-saturated states, as well as their water resistance coefficients. The test program was similar to that described in Example 1.

The comparison test results are given in Table below:

|   | Characteristics of Binder | Binder | |
|---|---|---|---|
|   |   | prior art | According to the present invention |
| 1 | Ultimate bending strength | | |
|   | - for the normal state, kg/cm² | 144 | 176 |
|   | - for the water-saturated state, kg/cm² | 75 | 150 |
| 2 | Ultimate compression strength | | |
|   | - for the normal state, kg/cm² | 438 | 778 |
|   | - for the water-saturated state, kg/cm² | 211 | 630 |
| 3 | Water resistance coefficient | | |
|   | - for bending | 0.52 | 0.85 |
|   | - for compression | 0.48 | 0.81 |

Unit energy consumption for preparation of the proposed binder is 25% lower than for preparation of the prior art binder.

From the concrete made with the use of the prior art binder and the binder prepared as disclosed in this example there were moulded test cubes measuring 10×10×10 cm. Quartz sand and crushed quarzite were used as inert fillers.

The specimens were subjected to compression test to determine the ultimate compression strength both for the normal and water-saturated states, the water resistance coefficient and the acid resistance. Said characteristics were determined by the method described in Example 1.

The test results are given in Table below:

| Characteristics of Concrete | Concrete made with the use of | |
|---|---|---|
| | prior art binder | binder according to the invention |
| 1 Ultimate compression strength | | |
| - for the normal state, kg/cm$^2$ | 980 | 1208 |
| - for the water-saturated state, kg/cm$^2$ | 509 | 1075 |
| 2 Water resistance coefficient | 0.52 | 0.89 |
| 3 Acid resistance, % | 97.2 | 99.1 |

EXAMPLE 7

A binder for a chemically resistant concrete according to the invention is produced in the following manner.

Sodium carbonate taken in an amount of 73 kg is mixed with quartz sand taken in an amount of 0.5 tons in a blade-paddle mixer. The homogeneous mixture thus obtained is moistened with water, placed into a rotary furnace and heated to 1300° C.

Being heated the sodium carbonate decomposes into the sodium oxide and carbon dioxide. As a result of reaction between the sodium oxide and silica on the surface of the quartz sand particles there are formed silicates. The mixture is treated at 1300° for one hour until conversion of substantially all quartz into a mixture of tridymite and cristobalite in the proportion of 4 to 1. The resultant alkaline-silica ingredient (mixture of tridymite and cristobalite containing 6 mol percent sodium oxide) is then cooled, with the temperature lowering rate being 8000° C. per hour, which is effected by placing said ingredient into a running water. Having been cooled and dried the lumps of mixture of tridymite and cristobalite, containing sodium oxide, are crushed with the aid of a hammer crusher to obtain 70% by weight of 0.315–1.25 mm fraction, and 30% by weight of dust-like fraction. The second ingredient (quartz sand) taken in amount of 825 kg is ground in a ball mill to obtain particles having a specific surface area of 4000 cm$^2$/g. Finely-divided quartz sand is mixed with a finely divided mixture of tridymite and cristobalite containing sodium oxide.

The binder composition thus obtained contains the following ingredients (by weight percent):
 quarts sand: 60
 crystalline modification of silica (mixture of tridymite and cristobalite) containing 6 mol percent sodium oxide: 40

From the binder thus obtained there were moulded equal in size prismoid specimens measuring 4×4×16 cm as described in Example 1, except for the duration of treatment in an autoclave at 190°, which in this case is 32 hours.

In a similar manner there were also formed specimens from the known in the art water-resisting binder based on a high-silica alkaline glass, containing the following ingredients (by weight percent):
 finely divided quartz sand: 60
 finely divided high-silica alkaline glass containing 8 mol percent sodium oxide: 40

For the purpose of comparison the proposed and the prior art binders were subjected to bending and compression tests for determining their ultimate bending and compression strengths for their normal and water-saturated states, as well as their water resistance coefficients. The test program was similar to that described in Example 1.

The comparison test results are given in Table below:

| Characteristics of Binder | Binder | |
|---|---|---|
| | prior art | According to the present invention |
| 1 Ultimate bending strength | | |
| - for the normal state, kg/cm$^2$ | 144 | 140 |
| - for the water-saturated state, kg/cm$^2$ | 75 | 116 |
| 2 Ultimate compression strength | | |
| - for the normal state, kg/cm$^2$ | 438 | 680 |
| - for the water-saturated state, kg/cm$^2$ | 211 | 517 |
| 3 Water resistance coefficient | | |
| - for bending | 0.52 | 0.83 |
| - for compression | 0.48 | 0.76 |

Unit energy consumption for production of the proposed binder is 50% lower than for production of the prior art binder.

From the concrete made with the use of the prior art binder and the binder prepared as disclosed in this example there were moulded test cubes measuring 10×10×10 cm. Quartz sand and crushed quarzite were used as inert fillers.

The specimens were subjected to compression test to determine the ultimate compression strength both for normal and water-saturated states, the water resistance coefficient and the acid resistance. Said characteristics were determined by the method described in Example 1.

The test results are given in Table below:

| Characteristics of Concrete | Concrete made with the use of | |
|---|---|---|
| | prior art binder | binder according to the invention |
| 1 Ultimate compression strength | | |
| - for the normal state, kg/cm$^2$ | 980 | 1050 |
| - for the water saturated state, kg/cm$^2$ | 509 | 924 |
| 2 Water resistance coefficient | 0.52 | 0.88 |
| 3 Acid resistance, % | 97.2 | 97.6 |

EXAMPLE 8

A binder for a chemically resistant concrete according to the invention is produced in the following manner.

A mixture containing sodium carbonate and sodium hydroxide (in the proportion 1 to 1) taken in an amount of 35 kg is mixed with 0.5 tons of quartz sand in a blade-paddle mixter. The homogeneous mixture thus obtained is placed into a rotary furnace and heated to 1300° C.

Being heated the sodium carbonate and the sodium hydroxide decompose into sodium oxide, carbone dioxide and water. As a result of reaction between sodium oxide and silica, silicates are formed on the surface of the quartz sand particles. Treating the mixture at 1300° C. is effected for one hour until conversion of quartz into tridymite. The resultant alkaline silica ingredient (tridymite containing 4 mol percent sodium oxide) is cooled with the temperature lowering rate being 800 deg.C. per hour, which is effected by blowing said ingredient with air. Having been cooled the lumps of the tridymite containing the sodium oxide are crushed in a hammer crusher to obtain particles having size of 0.315 mm. The second ingredient (quartz sand) taken in an amount of 0.788 tons is ground in a ball mill to obtain particles having specific surface area of 1000 cm²/gm. A finely divided quartz sand is mixed with the comminuted tridymite containing sodium oxide.

The binder thus obtained contains the following ingredients (by weight percent):
quartz sand: 60
crystalline modification fo silica (tridymite) containing 4 mol percent sodium oxide: 40

From the binder thus obtained there were moulded equal in size prismoid specimens as described in Example 1.

In a similar manner there were also formed specimens from the known in the art water-resisting binder based on a high-silica alkaline glass, containing the following amounts of ingredients (% by weight):
finely divided quartz sand: 60
finely divided high-silica alkaline glass containing 8 mol percent sodium oxide: 40

For the purpose of comparison the proposed and the prior artbinders were subjected to bending and compression tests for determining their ultimate bending and compression strengths for the normal and water-saturated states, as well as their water resistance coefficients. The test program was similar to that described in Example 1.

The comparison test results are given in Table below:

| | Characteristics of Binder | Binder | |
|---|---|---|---|
| | | prior art | According to the present invention |
| 1 | Ultimate bending strength | | |
| | - for the normal state, kg/cm² | 144 | 118 |
| | - for the water-saturated state, kg/cm² | 75 | 100 |
| 2 | Ultimate compression strength | | |
| | - for the normal state, kg/cm² | 438 | 385 |
| | - for the water-saturated state, kg/cm² | 211 | 300 |
| 3 | Water resistance coefficient | | |
| | - for bending | 0.52 | 0.85 |
| | - for compression | 0.48 | 0.78 |

Unit energy consumption for preparation of the proposed binder is 50% lower than for preparation of the prior art binder.

From the concrete made with the use of the prior art binder and the binder prepared as disclosed in this example there were moulded test cubes measuring 10×10×10 cm. Crushed quarzite was used as an inert filler. The specimens were subjected to compression test to determine the ultimate compression strength both for the normal and water-saturated states, the water resistance coefficient and the acid resistance. Said characteristics were determined by the method described in Example 1.

The test results are given in Table below:

| | Characteristics of Concrete | Concrete made with the use of | |
|---|---|---|---|
| | | prior art binder | binder according to the invention |
| 1 | Ultimate compression strength | | |
| | - for the normal state, kg/cm² | 497 | 645 |
| | - for the water-saturated state, kg/cm² | 214 | 576 |
| 2 | Water resistance coefficient | 0.43 | 0.90 |
| 3 | Acid resistance, % | 97.9 | 98.0 |

EXAMPLE 9

A binder for a chemically resistant concrete according to the present invention is obtained in the following manner.

Quartz sand in an amount of 0.5 tons is mixed in a blade-paddel mixer together with a mixture of 50% water solutions of sodium hydroxide and potassium hydroxide taken in an amount of 50 kg (by dry weight) and in the proportion 1 to 1.5. The homogeneous mixture thus obtained is placed into a rotary furnace and heated to 1000° C.

Being heated the sodium and potassium hydroxides decompose into sodium oxide, potassium oxide and water. As a result or reaction of sodium and potassium oxides with silica on the surface of the quarth sand particles there are formed silicates. Treating the mixture at 1000° is effected for 4 hours until conversion of quartz into crystobalite. The resultant alkaline silica ingredient (crystobalite containing 6 mol percent sodium and potassium oxides) is then cooled, with the temperature lowering rate being 2500° C. per hour, which is effected by blowing said ingredient with air. Having been cooled the lumps of the cristobalite containing sodium and potassium oxides are crushed in a hammer crusher to obtain particles having size of 0.315 mm. The second ingredient (quartz sand) taken in an amount of 0.227 tons is ground in a ball mill to obtain particles having specific surface area of 3000 cm²/g. Finely-divided quartz sand is mixed with the finely divided cristobalite containing sodium and potassium oxides. The binder thus obtained contains the following ingredients (by weight percent):
quartz sand: 30
crystalline modification of silica (cristobalite) containing 6 mol percent sodium and potassium oxides: 70

From the binder thus obtained there were moulded equal in size prismoid specimens as described in Example 1.

In a similar manner there were also produced specimens from the known in the art water-resisting binder based on a high-silica alcaline glass, containing the following amounts of ingredients (by weight percent):
finely divided quartz sand: 60
finely divided high-silica alkaline glass containing 8 mol percent sodium oxide: 40

For the purpose of comparison the proposed and the prior art binders were subjected to bending and compression tests for determining their ultimate bending and compression strength for their normal and water-saturated states as well as their water resistance coefficients. The test program was similar to that described in Example 1.

The comparison test results are given in Table below:

| Characteristics | Binder | |
|---|---|---|
| | prior art | According to the present invention |
| 1 Ultimate bending strength | | |
| - for the normal state, kg/cm² | 144 | 96 |
| - for the water-saturated state, kg/cm² | 75 | 56 |
| 2 Ultimate compression strength | | |
| - for the normal state, kg/cm² | 438 | 320 |
| - for the water-saturated state, kg/cm² | 211 | 186 |
| 3 Water resistance coefficient | | |
| - for bending | 0.52 | 0.58 |
| - for compression | 0.48 | 0.58 |

Unit energy consumption for production of the proposed binder is 15% lower than for production of the prior art binder.

From the concrete made with the use of the prior art binder and the binder prepared as disclosed in this example there were moulded test cubes measuring 10×10×10 cm. Quartz sand was used as an inert filler. The specimens were subjected to compression test to determine the ultimate compression strength both for the normal and water-saturated states, as well as the water resistance coefficient and the acid resistance. Said characteristics were determined by the method described in Example 1.

The test results are given in Table below:

| Characteristics of Concrete | Concrete made with the use of | |
|---|---|---|
| | prior art binder | binder according to the invention |
| 1 Ultimate compression strength | | |
| - for the normal state, kg/cm² | 540 | 597 |
| - for the water-saturated state, kg/cm² | 309 | 484 |
| 2 Water resistance coefficient | 0.57 | 0.81 |
| 3 Acid resistance, % | 99.2 | 99.0 |

EXAMPLE 10

A binder for a chemically resistant concrete according to the present invention is produced in the following manner.

A mixture in an amount of 78 kg containing dry sodium carbonate and potassium carbonate in the proportion 1 to 1.5 is mixed with quartz sand taken in an amount of 0.5 tons in a blade-paddle mixer.

The homogeneous mixture thus obtained is moistened with water, placed into a rotary furnace and heated to 1250° C.

Being heated the sodium carbonate and the potassium carbonate decompose into sodium and potassium oxides and carbon dioxide. As a result of reaction of sodium and potassium oxides with silica there are formed silikates on the surface of the quartz sand particles. The resultant mixture is treated at 1250° C. for one hour until conversion of quartz into tridymite. The resultant alkaline silica ingredient (tridymite) containing 6 mol percent sodium and potassium oxides) is then cooled, with the temperature lowering rate being 1000 deg.C. per hour, which is achieved by blowing said ingredient with air. Having been cooled the lumps of the tridymite containing sodium and potassium oxides are crushed with the aid of a hammer crusher to particle size of 1.25 mm. The second ingredient (quartz sand) taken in an amount of 0.55 tons, is ground with the aid of a ball mill to obtain particles having a specific surface area of 4000 cm²/g. A finely-divided quartz sand is mixed with the finely divided tridymite containing sodium and potassium oxides. The binder thus obtained contains the following ingredients (by weight percent):

quartz sand: 50 crystalline modification of silica (tridymite) containing 6 mol percent oxides: 50

From the binder thus obtained there were moulded equal in size prismoid specimens, as described in Example 1.

In a similar manner there were also formed specimens from the known in the art water-resisting binder based on a high-silica alkaline glass containing the following ingredients (by weight percent):

finely divided quartz sand: 60 finely silica alkaline glass containing 8 mol percent sodium oxide: 40

For the purpose of comparison the proposed and the prior art binders were subjected to bending and compression tests for determining their ultimate bending and compression strength for the normal and water-saturated states as well as their water resistance coefficients. The test program was similar to that described in Example 1.

The comparison test results are given in Table below:

| Characteristics of Binder | Binder | |
|---|---|---|
| | prior art | According to the present invention |
| 1 Ultimate bending strength | | |
| - for the normal state, kg/cm² | 144 | 133 |
| - for the water-saturated state, kg/cm² | 75 | 98 |
| 2 Ultimate compression strength | | |
| - for the normal state, kg/cm² | 438 | 580 |
| - for the water-saturated state, kg/cm² | 211 | 406 |
| 3 Water resistance coefficient | | |
| - for bending | 0.52 | 0.74 |
| - for compression | 0.48 | 0.70 |

Unit energy consumption for production of the proposed binder is 30% lower than for production of the prior art binder.

From the concrete made with the use of the prior art binder and the binder prepared as disclosed in this example there were moulded test cubes measuring 10×10×10 cm. Quartz sand and crushed quarzite were used as inert fillers. The specimens were subjected to compression test to determine the ultimate compression strength both for the normal and watersaturated states, as well as the water resistance coefficient and the acid resistance. Said characteristics were determined by the method described in Example 1.

The test results are given in Table below:

| Characteristics of Concrete | Concrete made with the use of | |
|---|---|---|
| | prior art binder | binder according to the invention |
| 1 Ultimate compression strength | | |
| - for the normal state, kg/cm$^2$ | 980 | 872 |
| - for the water-saturated state, kg/cm$^2$ | 509 | 680 |
| 2 Water resistance coefficient | 0.52 | 0.78 |
| 3 Acid resistance, % | 97.2 | 97.7 |

While the invention has been described herein in terms of the preferred embodiments, it may be variously otherwise embodied within the scope of the appended claims.

What I claim is:

1. A binder for a chemically resistant concrete, comprising from 30 to 80% by weight of a finely divided quartz sand having a specific surface area of from 1000 to 5000 cm$^2$/g and from 20 to 70% by weight of at least one crystalline modification of silica selected from the group consisting of tridymite and cristobalite and containing on the surface of its particles from 0.5 to 6 mol percent at least one R$_2$O oxides, wherein R is sodium or potassium.

2. A binder as claimed in claim 1, wherein said crystalline modification of silica contains not less than 70% by weight of particles with a size of from 0.315 to 1.25 mm, the balance being a dust-like fraction.

3. A binder as claimed in claim 1, wherein said modified silica ingredient includes said tridymite containing 6 mol percent of said oxide.

4. A binder as claimed in claim 1, wherein said modified silica ingredient contains 6 mol percent of said potassium oxide.

5. A binder as claimed in claim 1, wherein said modified silica ingredient contains 0.5 mol percent sodium oxide.

6. A binder as claimed in claim 1, containing 70% by weight tridymite and 30% by weight of finely divided quartz sand.

7. A binder as claimed in claim 1, containing a mixture tridymite and cristobalite.

8. A binder as claimed in claim 7, wherein said mixture contains 1 part cristobalite to 4 parts tridymite.

9. A process for producing a binder for a chemically resistant concrete according to claim 1, comprising:
 (a) mixing quartz sand together with from 0.7 to 15% by weight of at least one compound selected from the group consisting of sodium carbonate, potassium carbonate, sodium hydroxide and potassium hydroxide;
 (b) heating the resultant mixture to a temperature of 1000°–1550° C. to produce an oxide R$_2$O, wherein R is sodium or potassium, and wherein said oxide is chemically bound on the surface of the quartz sand particles;
 (c) treating at said temperature to produce at least one crystalline modification of silica selected from the group consisting of cristobalite and tridymite;
 (d) cooling said mixture;
 (e) grinding said crystalline modification of silica containing said oxide;
 (f) grinding quartz sand into particles having a specific surface area of from 1000 to 5000 cm$^2$/g; and
 (g) mixing said finely divided quartz sand together with said finely divided crystalline modification of silica containing said oxide.

10. A process as claimed in claim 9, wherein the crystalline modification of silica containing said oxide is cooled at a temperature lowering rate not less than 800 deg.C. per hour.

11. A process as claimed in claim 9, wherein said sodium hydroxide is added to said quartz sand in an amount of 0.7% by weight.

12. A process as claimed in claim 9, wherein said potassium carbonate is added to quartz sand in an amount of 15% by weight.

13. A process as claimed in claim 9, wherein the mixture of quartz sand with a compound selected from the group consisting of sodium carbonate, potassium carbonate, sodium hydroxide, potassium hydroxide and a mixture thereof is treated at a temperature of 1200° C. for 30 minutes until substantially all the quartz is converted into said cristobalite.

14. A process as claimed in claim 9, wherein the mixture of quartz sand with at least one compound selected from the group consisting of sodium carbonate, potassium carbonate, sodium hydroxide, potassium hydroxide and a mixture thereof is treated at a temperature of from 1200° to 1400° C. for 0.5–1.0 hours until substantially all the quartz is converted into said tridymite.

15. A process as claimed in claim 9, wherein the mixture of said quartz sand with a compound selected from the group consisting of sodium carbonate, potassium carbonate, sodium hydroxide, potassium hydroxide and a mixtures thereof is treated at a temperature of 1550° C. for 10 minutes.

16. A process as claimed in claim 9 wherein the compound selected from the group consisting of sodium carbonate, potassium carbonate, sodium hydroxide, potassium hydroxide, and a mixture thereof is dissolved in water before mixing with said quartz sand.

17. A process as claimed in claim 9, wherein said mixture of quartz sand and at least one dry compound selected from the group consisting of sodium carbonate and potassium carbonate and the resultant mixture is moistened before heating.

* * * * *

UNITED STATES PATENT AND TRADEMARK OFFICE
CERTIFICATE OF CORRECTION

PATENT NO. : 4,234,347
DATED : Nov. 18, 1980
INVENTOR(S) : Vsevolod P. Kirilishin It is certified that error appears in the above—identified patent and that said Letters Patent is hereby corrected as shown below:

Column 1, line 50: "alkalt" should be --alkali--.

Column 2, line 17: "decreasig" should be --decreasing--.

line 22: Delete "(".

line 36: "silic" should be --silica--.

Column 3, line 13: "due of" should be --due to--.

line 33: "be" should be --by--.

line 34: "ben" should be --been--.

Column 4, line 1: "qurtz" should be --quartz--.

Column 5, line 46: "constiture" should be --constitute--.

Column 6, line 6: "ase" should be --case--.

line 7: "convertion" should be --conversion--.

line 61: "weigh" should be --weight--.

Column 9, line 35: "anmount" should be --amount--.

Column 10, line 39: "on" should be --an--.

Column 11, line 28: "exept" should be --except--.

Column 13, line 63: "partiles" should be -- particles --.

UNITED STATES PATENT AND TRADEMARK OFFICE
CERTIFICATE OF CORRECTION

PATENT NO. : 4,234,347

DATED : Nov. 18, 1980

INVENTOR(S) : Vsevolod P. Kirflishin

It is certified that error appears in the above—identified patent and that said Letters Patent is hereby corrected as shown below:

Column 16, line 62: "carbone" should be --carbon--.

Column 18, line 21: "paddel" should be --paddle--.

line 30: "quarth" should be --quartz--.

line 57: "alcaline" should be --alkaline--.

Column 19, lines 62-63: "silikates" should be --silicates--.

Column 22, line 44: "mixtures" should be --mixture--.

Signed and Sealed this

Twelfth Day of May 1981

[SEAL]

Attest:

RENE D. TEGTMEYER

*Attesting Officer*     *Acting Commissioner of Patents and Trademarks*